(No Model.)

C. H. BRADY.
BUSHING FOR FAUCETS.

No. 280,344. Patented July 3, 1883.

Witnesses.
A. H. Adams.
O. W. Bond

Inventor.
Christian H. Brady.

UNITED STATES PATENT OFFICE.

CHRISTIAN H. BRADY, OF CHICAGO, ILLINOIS.

BUSHING FOR FAUCETS.

SPECIFICATION forming part of Letters Patent No. 280,344, dated July 3, 1883.

Application filed July 21, 1882. (No model.)

*To all whom it may concern:*

Be it known that I, CHRISTIAN H. BRADY, residing at Chicago, in the county of Cook and State of Illinois, and a citizen of the United States, have invented new and useful Improvements in Bushings for Faucets, of which the following is a full description, reference being had to the accompanying drawings, in which—

Figure 1:
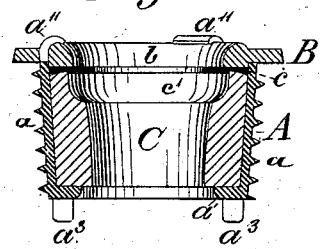
Figure 3:
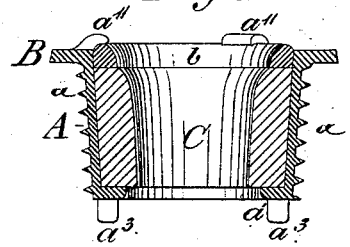
Figure 2:
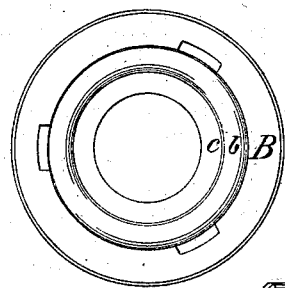
Figure 4:
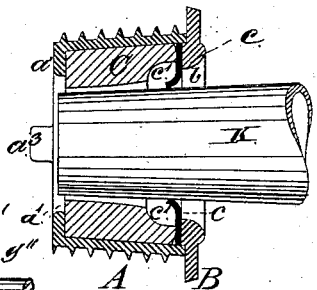
Figure 5:
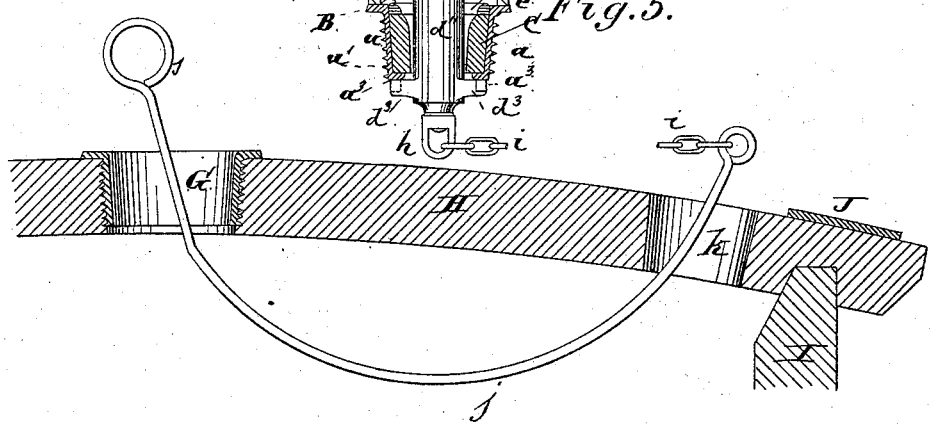

Figure 1 is a central section through the complete bush; Fig. 2, a top or plan view of the flange and the gland and gasket shown in Fig. 1; Fig. 3, a central section, showing a modification in the form of the lining and the form of flange and gland; Fig. 4, a section through the bush, showing the end of the faucet inserted therein. Fig. 5 shows a section of the stave with a bung-bushing in section, and the opening for the faucet-bushing, also a form of wrench and devices connected therewith for inserting the faucet-bushing, which is shown in position on the wrench, ready for insertion.

This invention relates to certain improvements in bushings or bungs which receive faucets for drawing off the contents of barrels and similar vessels.

The invention has for its object to provide a bushing of novel construction, in which is secured a non-elastic lining which is compressible when moist.

The improvement will be first described in detail, and afterward pointed out in the claims.

In the drawings, A represents the metallic shell, which may be made of malleable iron or other suitable material, which can be cast or otherwise formed to have an exterior slightly tapering, with a tapering or straight interior. As shown, the exterior is provided with a screw-thread, $a$, to enable the bush to be inserted by screwing it to place, but which might have its exterior provided with teeth or notches shaped to allow the bush to be easily driven in, and when in held firmly. This bush, at its inner end, has an inwardly-projecting flange, $a'$, with an opening for the passage of the faucet, and, as shown in Fig. 1, its upper end is provided with a series of spurs or projections, $a''$, which form clinchers for securing the flange to the outer end of the shell.

B is the flange at the outer end of the shell, for engaging with a stave when the bush is down to place. This flange B may be made of a piece of malleable iron or other suitable material, independent of the shell, or may be cast or formed with the shell. When made independent of the shell, it is to be provided with holes corresponding in number, size, and location to the number, size, and location of the spurs or projections $a''$, to receive such spurs or projections, which, after being passed through the holes, have their ends turned down or clinched, attaching the flange and shell firmly together. This form of flange is shown in Fig. 2, and the manner of uniting it to the shell is shown in Fig. 1. This flange may be cast or formed with the shell, as shown in Fig. 3, and when so cast or formed the spurs or projections $a''$ are located thereon for the purpose of holding the gland, which, when the flange and shell are made of one piece, is to be made of an independent piece. This gland $b$, when the flange B is independent of the shell, is formed with the flange, and projects both above and below the flange, and is of an annular or ring form, with an exterior diameter corresponding to the interior diameter of the shell, so that the portion which projects below the flange B can be inserted in the shell. When the flange is formed with the shell, the gland $b$ is formed of an independent piece of an annular or ring form, with the exterior diameter corresponding to the interior diameter of the shell for inserting the gland, which, when inserted, is held in place by turning the spurs or projections $a''$ on the flange B thereover. The opening of the gland $b$ is rounded off, as shown, to facilitate the insertion of the faucet, but may be left straight, if desired.

C is the lining, made of any suitable material possessing the quality of being non-elastic, and at the same time compressible, when moist or wet, without becoming soft to an extent to render it worthless as a compress in holding the faucet. For this purpose the best material known to me for making the lining is the material known in trade as "vulcanized fiber," as it possesses the quality of being non-elastic, and at the same time compressible, when moist or wet, to an exceedingly high degree. Prepared paper, such as used for making car-wheels and other articles, could be used for this lining and be found well adapted for the purpose, and other materials possessing the qualities of the vulcanized fiber or the prepared paper could be used, and by using such material the objections which have heretofore existed in linings of wood, leather, rubber, and other elastic material will not be found, as this non-elastic lining will not wear out with one or two insertions of the faucet, like wood, but will remain firm and intact for a long period of time, as it returns to its normal condition of being non-elastic when dried after being moistened or wet. It does not wear out readily, like leather, and retains its quality of acting as a compress around the faucet, which leather soon loses, producing leakage and wastage unless replaced by a new piece, and it does not become soft, sticky, and pliable from the action of the contents of the keg or barrel, like rubber or other elastic materials, which are liable, from this cause, to stick or adhere to the faucet, interfering with its easy removal, which objection is entirely overcome with a non-elastic material compressible when moist or wet, like vulcanized fiber or prepared paper, as such material is non-affected from the contents, and remains firm, not adhering or sticking to the faucet, allowing the faucet to be readily and easily removed.

From the foregoing it will be seen that a bushing is provided which will hold the faucet firmly in place, prevent leakage and wastage around the faucet, and permit the ready insertion and removal of the faucet without injurious effects on the lining, all of which features are very desirable in producing a perfect result.

The lining C may be formed, as shown in Figs. 1 and 4, with a groove, $c'$, in its outer end; or it may be formed without such groove, as shown in Fig. 3, and when in position its inner end rests on and is supported by the rim or flange $a'$, and it is held in place by the gland $b$, which comes against the outer end, or an interposed gasket or buffer, $c$. This gasket or buffer $c$ may be a piece of rubber or other elastic material of an annular or ring form, with an opening for the insertion of the faucet, the exterior of which faucet engages the gasket or buffer and turns it inward, as shown in Fig. 4, the groove $c'$ allowing the gasket or buffer to turn in to a greater extent than if the interior surface of the lining were left plain, as in Fig. 3. This buffer or gasket furnishes a protection for the lining in inserting the faucet, and also acts as a guard to prevent the spurt which occurs when the faucet is forced into place. When screw-threaded, some means are to be provided for screwing the bushing down to place, and in Fig. 5 is shown a device for this purpose; but this device is to be made the subject-matter of a separate application, and is only shown for the purpose of illustrating how the bushing can be inserted, and is therefore not specifically herein described.

D represents a shank or stem divided into three sections, $d\ d'\ d''$, the end of the section $d''$ having side ears or projections, $d^3$, which, when the device is in use, engage the ears or lugs $a^3$ on the bush.

E E$'$ is a socket or bearing in which the stem or shank D is inserted. The portion E of this socket has a bell-shaped end, $e$, to furnish a backing for the bushing, and the stem or shank, when inserted, is held in place by the nut $f$.

F is a handle inserted in the socket or bearing, and furnishing the means for turning the bushing into place.

G is a metallic bushing for the bung.

H is a stave of a keg or barrel.

I is a head of a keg or barrel.

J is a hoop.

K is an ordinary faucet, the end only being shown.

As shown, the nut $f$ is encircled by a ring, $g$, to which is attached one end of a chain, $g'$, the other end of which is attached to an ear or eye, $g''$, on the socket E, the object being to prevent the nut $f$ from becoming lost or mislaid. A swivel or eye, $h$, is attached to the end $d''$, and a chain, $i$, is attached to this swivel and to a wire, $j$, having an eye or finger-loop, $j'$, for the purpose of withdrawing the stem or shank after the bushing is inserted.

The operation of this inserting device is as follows: The bushing is placed on the inserting device, as shown in Fig. 5, when by turning the handle the bushing will be forced down to place, after which the stem can be disengaged by unscrewing the nut $f$, when it will drop into the barrel or keg, from which it can be withdrawn through the bush-opening G by the wire $j$ and chain $i$.

Other means than those shown can be used for inserting the bushing; but such means form no part of the present invention, which is confined to a bushing of the character described and shown.

What I claim as new, and desire to secure by Letters Patent, is as follows:

1. The shell A, lined interiorly with non-elastic material, and having at its outer end a laterally-projecting rim or flange provided with a gland, $b$, in the form of a ring, which is thicker than the rim or flange which carries it, to provide an annular projection which is removably fitted within the shell against its annular wall, said gland being constructed separate from the shell to provide for the convenient insertion and retention of the lining, substantially as described.

2. The combination of a metallic shell, A, lined with non-elastic material, and having at its outer end a laterally-projecting rim or flange provided with a gland formed independent of the shell, said gland being in the form of a ring, and of a thickness greater than the rim or flange which carries it, to form an annular projection which is removably fitted within the shell against its annular wall, and means for confining the projection of the gland in the shell, whereby the lining can be conveniently inserted in the shell, and the gland applied to confine the lining in place, substantially as described.

3. A metallic shell, A, having a rim or flange, $a'$, rim or flange B, and gland $b$, in combination with a lining, C, of non-elastic material, compressible when moist or wet, and a gasket, $c$, substantially as and for the purposes specified.

4. The combination, with the bushing A, lining C, and gland $b$, of the spurs or projections $a''$, for holding the gland down upon the lining, all substantially as shown and described.

CHRISTIAN H. BRADY.

Witnesses:
A. H. ADAMS,
B. A. PRICE.